May 8, 1951        E. A. COUGHLIN        2,552,261

PUMP FOR AERATING WATER

Filed June 28, 1947

*INVENTOR.*
EARL A. COUGHLIN
BY
ATTORNEY

Patented May 8, 1951

2,552,261

UNITED STATES PATENT OFFICE 2,552,261

PUMP FOR AERATING WATER

Earl A. Coughlin, Detroit, Mich.

Application June 28, 1947, Serial No. 757,853

2 Claims. (Cl. 230—170)

This invention relates to pumps and, in particular, it relates to a pump adapted for the purpose of aerating water for sustaining fish life.

In the preservation of fish life, such as minnows, much difficulty is encountered in replacing oxygen in the water which normally is depleted by the fish. The preservation of minnows is highly important to the average fisherman, and particularly when it is necessary to transport the fish substantial distances. In most cases, minnows are transported for fishing purposes by a vehicle in which the power available is a combustion engine. For example, traveling to inland lakes minnows are transported in a bucket carried in an automobile. In other cases the minnows are transported in a boat having either an inboard or an outboard motor. In all of these conditions the power of an internal combustion engine is available. The most ideal source of power in a combustion engine for this purpose is vacuum available at the intake manifold of the engine.

Essentially, my invention constitutes an enclosure separated by a flexible diaphragm in a manner so as to comprise a vacuum pump on one side, and a compression pump on the opposite side of the diaphragm. Movement of the diaphragm by the vacuum source is utilized for operating a valve for cutting off the vacuum supply, while a spring functions to open the valve in a succession of pulsating movements constituting a pump action.

Among the objects of my invention are to provide a pump capable of aerating water in which the power source used is readily available; to provide a pump for the purpose stated which is automatic in operation; to provide such a pump which may be utilized with any type of container, or minnow bucket; to provide such a pump which will utilize a very slight amount of power for operation; and, to provide such a pump which is small and compact, and which will function efficiently over long periods of use, and which is economical of manufacture. These and other objects and advantages will appear more fully in the following detailed description when considered in connection with the accompanying drawing, in which:

Figure 2:
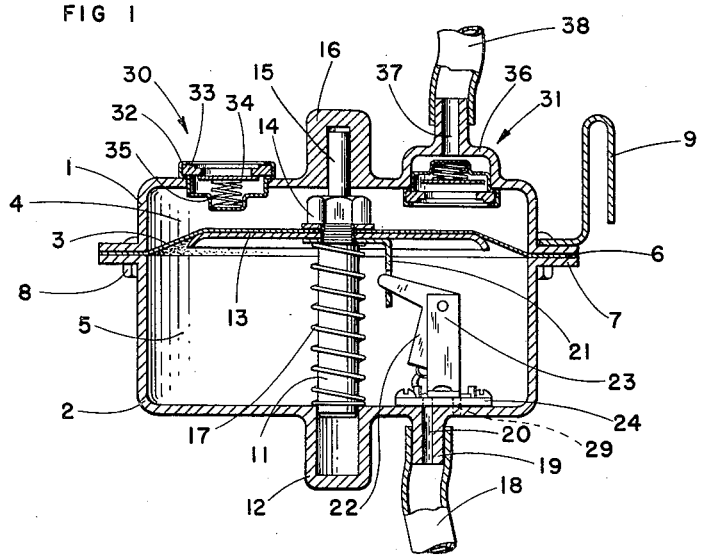
Figure 2 is a view, in section, of the complete embodiment of my invention.

With reference to the drawing, and in particular to Figure 2, I show an embodiment of my invention constituting essentially an upper housing 1 and a lower housing 2 divided by a flexible diaphragm 3, so as to form a compression chamber 4 and a vacuum chamber 5. Flanges 6 and 7 formed on the housings 1 and 2, respectively, constitute means for clamping the flexible diaphragm 3 therebetween. Machine screws 8 operate to clamp the flanges 6 and 7 together. Also clamped onto the unit by the machine screws 8 is a suitable hook 9 for the purpose of hanging the unit onto a pail, or bucket, such as 10.

Positioned axially of the housing 2 is a shaft 11 slidably supported in a boss 12 extending from the housing 2. A supporting plate 13 is held in position adjacent to the diaphragm 3. Both the plate 13 and the diaphragm 3 are secured to the shaft 11 by means of a nut 14. A continuation portion 15 of the shaft 11 projects into a boss 16 extending from the housing 1. By this arrangement, the shaft 11 is restricted to reciprocal movement relative to the housings 1 and 2. A spring 17 normally maintains the diaphragm 3 in an upward position.

A flexible hose 18 extending to a vacuum source, such as the intake manifold of a combustion engine, is connected to a projection 19 extending from the housing 2. An orifice 20 is formed through the projection 19, and serves as means through which the compartment 5 may be evacuated. The chamber 5, which is otherwise enclosed, upon evacuation of air therefrom causes the diaphragm 3 to move downwardly compressing the spring 17. Attached to the shaft 11 is an arm 21. This arm engages a lever 22 pivotally supported by a bracket 23 fastened to a plate 24 attached to the housing 2. Connected to the bottom of the lever 22 is a spring 25 while the opposite end of the spring is attached to a valve member 26 pivoted to the plate 24. The arrangement of the lever 22, spring 25, and valve member 26, is such that movement of the lever 22 applies tension to the spring 25, and this tension actuates the valve member 26 only after the lever passes the dead center of the pivot point through which the valve member 26 is attached to the plate 24. Extending through the plate 24 is an aperture 27 which is in alignment with the aperture 20 leading to the vacuum source. Also extending through the plate 24 is an aperture 28 which aligns with an aperture 29 extending through the wall of the housing 2. This is the atmospheric port.

Figure 4:
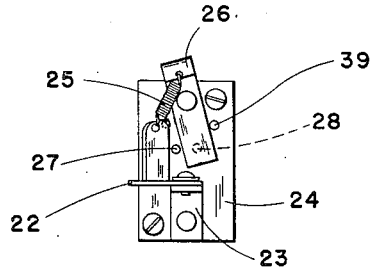
Figure 4 is a plan view of the vacuum valve mechanism, as shown in Figure 2; and, Figure 5 is a side elevational view of the valve mechanism, as shown in Figure 4.
Figure 5:
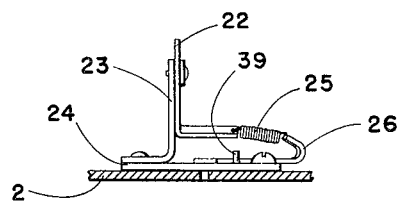

The operation of the valve mechanism, as shown in Figure 4, is such that as vacuum enters the apertures 20 and 27 it reduces the pressure in the chamber 5 causing the diaphragm 3 to move downwardly against the action of the spring 17. As the diaphragm reaches the end of its downward stroke, the lever 22 is actuated by its engagement with the arm 21 to cause a snap action of the valve member 26 to close the inlet port 27 and open the atmospheric port 28. This action allows the atmosphere to enter the port 28 and causes the spring 17 to move the diaphragm 3 in its upward position. When its upward position is attained, the lever 22 is again actuated to close the atmospheric port 28 and open the vacuum source port 27 to automatically produce a reciprocating cycle of operation. A pin 39 projecting from the plate 24 on either side of the valve member 26 limits the extension of movement of the valve member.

Figure 1:
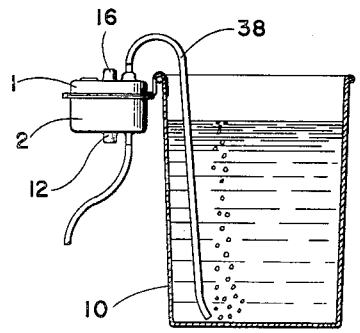
Figure 1 is an assembly view, in side elevation, illustrating an application of the pump with the bucket shown in cross section.
Figure 3:
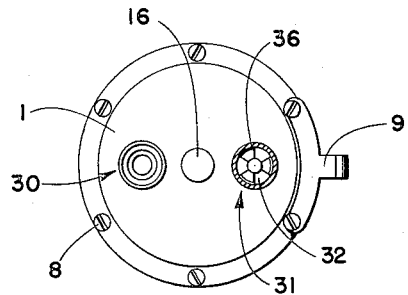
Figure 3 is a plan view thereof, partly in section.

The upper housing 1 which forms the chamber 4 is provided with an inlet air valve 30 and an outlet air valve 31. Both of these valves are identical except that one is inverted and, therefore, details of only one of the valves is described herein. The valve 30, which is the air inlet valve, consists of a casing 32 which supports a valve seat 33 and a valve 34. A light spring 35 normally maintains the valve against its seat. The housing 32, as shown in Figure 3, is apertured to permit ready ingress of air through the valve assembly. The outlet valve 31 is confined within an extension boss 36 forming a part of the housing 1, and an apertured projection 37 forms a continuation of the boss 36. A flexible hose 38 connects with the aperture projection 37, and may be of such suitable length as to extend to the bottom of a pail, or bucket.

In the operation of the compression chamber 4, downward movement of the diaphragm 3 deflects the spring 35, causing the valve 34 to open, thus permitting a quantity of air to move into the chamber 4. During this downward movement the outlet valve 31 remains in a closed position. As the diaphragm 3 moves upward, the valve assembly 30 closes and the valve assembly 31 opens so that a portion of the air within the chamber 4 is moved therefrom through the outlet and through the flexible hose 38.

The pump mechanism, as thus described, provides an efficient and automatic arrangement for producing forced air such as for the purpose of aerating water to sustain fish life. The speed of operation of the device may be controlled by the size of the inlet aperture 29. I have found that from practical experience this aperture need only be approximately $\frac{1}{32}$ inch in diameter. Such a small diameter opening does not require much vacuum to operate the mechanism. As a result, there is little or no impairment in the efficiency of the combustion engine with which the present device is intended for use. Experiments have demonstrated that a device as thus described has functioned satisfactorily to maintain minnows alive in a small bucket while being transported in an automobile for distances over two hundred miles. Experiments have also indicated that minnows may be preserved by this method for indefinite periods of at least eight to ten hours.

It is therefore believed apparent that I have provided a novel and useful means for preserving fish life, and particularly minnows, in which its practical application has been well established by extensive demonstrations.

While I have shown a preferred embodiment of my invention, it is to be understood that it is susceptible of those modifications which appear obviously within the spirit of the invention and within the scope of the appended claims.

Having thus described my invention, what I claim and desire to protect by Letters Patent is:

1. A device operable by reduced air pressure for aerating water comprising, a housing, a flexible diaphragm dividing the housing to form a vacuum chamber and a pressure chamber, the walls of the housing of the vacuum chamber and the pressure chamber having inlet and outlet ports, a spring actuated valve operable by air pressure in the inlet and outlet ports of the pressure chamber, movement of the diaphragm to its downward position being caused by vacuum applied to the inlet port of the vacuum chamber, a pin attached to and positioned axially of the diaphragm and having its ends slidably supported by said housing, a sliding valve positioned within the vacuum chamber, a valve member pivoted in relation to the housing and adaptable to close either the inlet or outlet ports of the vacuum chamber, a bell-crank lever actuatable by movement of the diaphragm, and a spring connection between the bell-crank lever and the valve member for imparting a snap-action movement to the valve member, and a compression spring for returning the diaphragm to its upward position, whereby reciprocal operation of the diaphragm in one direction by vacuum and a spring return movement results in the generation of above-atmospheric pressure in the pressure chamber.

2. A device operable by reduced air pressure for aerating water comprising, a housing, a flexible diaphragm dividing the housing to form a vacuum chamber and a pressure chamber, a shaft attached to the diaphragm and having its ends slidably supported by the housing, the walls of the housing of the vacuum chamber and the pressure chamber having inlet and outlet ports, a spring actuated valve operable by air pressure in the inlet and outlet ports of the pressure chamber, movement of the diaphragm to its downward position being caused by vacuum applied to the inlet port of the vacuum chamber, a valve positioned within the vacuum chamber, a sliding valve member pivoted in relation to the housing and adaptable to close either the inlet or outlet ports of the vacuum chamber, a bell-crank lever actuatable by movement of the diaphragm, and a spring connection between the bell-crank lever and the valve member for imparting a snap action movement to the valve member, and a compression spring for returning the diaphragm to its upward position, whereby reciprocal operation of the diaphragm in one direction by vacuum and a spring return movement results in the generation of above-atmospheric pressure in the pressure chamber.

EARL A. COUGHLIN.

REFERENCES CITED

The following references are of record in the file of this patent:

UNITED STATES PATENTS

| Number | Name | Date |
|---|---|---|
| 299,765 | Evans | June 3, 1884 |
| 1,073,353 | Kraning | Sept. 16, 1913 |
| 1,117,982 | Curtis | Nov. 24, 1914 |
| 1,337,563 | Johnson | May 11, 1920 |
| 1,604,971 | Churchill | Nov. 2, 1926 |
| 1,912,203 | Hueber | May 30, 1933 |
| 2,079,858 | Horton | May 11, 1937 |
| 2,233,564 | West | Mar. 4, 1941 |

FOREIGN PATENTS

| Number | Country | Date |
|---|---|---|
| 585,168 | Germany | Sept. 1933 |